(12) United States Patent
Vanderburgh et al.

(10) Patent No.: US 10,583,780 B1
(45) Date of Patent: Mar. 10, 2020

(54) VEHICLE COLLISION WARNING SYSTEM AND METHOD

(71) Applicant: Honda Motor Co., Ltd., Tokyo (JP)

(72) Inventors: David Albert Vanderburgh, Dublin, OH (US); Justin T. Longwell, Westerville, OH (US); Steven Feit, Dublin, OH (US); Brian P. Baker, Raymond, OH (US); Joseph A. Heater, Raymond, OH (US); Randy L. Skiles, Raymond, OH (US); Jordan J. Marker, Raymond, OH (US); David A. Thompson, Raymond, OH (US); Gregory A. Barlage, Raymond, OH (US); Peter J. Cardimen, Raymond, OH (US); David Bryant, Dublin, OH (US); Jason Dutter, Marysville, OH (US); Kin C. Fung, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/228,220

(22) Filed: Dec. 20, 2018

(51) Int. Cl.
| | | |
|---|---|---|
| *B60Q 1/00* | (2006.01) | |
| *B60Q 9/00* | (2006.01) | |
| *B60R 1/00* | (2006.01) | |
| *B60W 50/14* | (2020.01) | |

(52) U.S. Cl.
CPC ............ *B60Q 9/008* (2013.01); *B60R 1/00* (2013.01); *B60R 2300/105* (2013.01); *B60R 2300/8066* (2013.01); *B60W 50/14* (2013.01); *B60W 2050/143* (2013.01); *B60W 2510/1005* (2013.01)

(58) Field of Classification Search
CPC ..... B60Q 9/008; B60R 1/00; B60R 2300/105; B60R 2300/8066; B60W 50/14; B60W 2050/143; B60W 2510/1005
USPC .......................................................... 340/435
See application file for complete search history.

(56) References Cited

U.S. PATENT DOCUMENTS

| | | | |
|---|---|---|---|
| 6,446,998 B1 | 9/2002 | Koenig et al. | |
| 6,508,325 B1 * | 1/2003 | Schwarz ............... | B60Q 9/006 180/167 |
| 7,301,479 B2 | 11/2007 | Regan | |
| 7,413,211 B2 | 8/2008 | Hendry et al. | |

(Continued)

FOREIGN PATENT DOCUMENTS

DE    102010042647    10/2011

*Primary Examiner* — Kerri L McNally
*Assistant Examiner* — Thang D Tran
(74) *Attorney, Agent, or Firm* — Mark E. Duell; Rankin, Hill & Clark LLP (57) ABSTRACT

A vehicle collision warning system and method detects a rear-center area impending collision and a rear-lateral-corner area impending collision, and controls an operator alarm in one of a standard mode and a towing mode. In the standard mode, the operator alarm is controlled to provide an alert to an operator when the rear-center area impending collision is detected and/or the rear-lateral-corner area impending collision is detected. In the towing mode, the operator alarm is controlled to provide the alert to the operator when the rear-lateral-corner area impending collision is detected by the rear-lateral-corner area impending collision detection module, and to provide no alert to the operator when the rear-center impending collision is detected by the rear-center area impending collision detection module.

20 Claims, 6 Drawing Sheets

(56) References Cited

U.S. PATENT DOCUMENTS

| | | |
|---|---|---|
| 7,612,657 B2 | 11/2009 | Kim |
| 8,350,684 B2 | 1/2013 | McClure |
| 8,532,870 B2 | 9/2013 | Hoetzer et al. |
| 8,618,955 B2 | 12/2013 | Baker |
| 9,061,629 B2 | 6/2015 | Miller et al. |
| 9,199,640 B2 * | 12/2015 | Weston ................ B60W 10/16 |
| 9,248,858 B2 * | 2/2016 | Lavoie ................. B62D 13/06 |
| 9,428,220 B2 * | 8/2016 | Hueger ................ B62D 13/06 |
| 9,493,117 B2 | 11/2016 | Shehan et al. |
| 9,566,911 B2 | 2/2017 | Greenwood et al. |
| 9,594,155 B2 | 3/2017 | Cashier et al. |
| 9,937,861 B2 | 4/2018 | Shehan et al. |
| 2002/0147534 A1 * | 10/2002 | Delcheccolo ...... B60K 31/0008 701/45 |
| 2005/0068197 A1 * | 3/2005 | Regan ..................... G08G 1/16 340/932.2 |
| 2008/0231701 A1 * | 9/2008 | Greenwood ............. B60R 1/00 348/148 |
| 2012/0062743 A1 * | 3/2012 | Lynam .................. B60Q 9/005 348/148 |
| 2014/0085472 A1 * | 3/2014 | Lu ........................... B60R 1/002 348/148 |
| 2014/0218522 A1 * | 8/2014 | Lavoie ................. G08G 1/0962 348/148 |
| 2014/0253307 A1 * | 9/2014 | Miller ................... B60Q 9/008 340/431 |
| 2014/0340516 A1 * | 11/2014 | Vojtisek ................. B60R 1/00 348/148 |
| 2016/0129939 A1 * | 5/2016 | Singh ................... B62D 13/06 701/41 |
| 2016/0159347 A1 * | 6/2016 | Lavoie ................. B60W 10/18 701/41 |
| 2017/0160395 A1 | 6/2017 | Ludwig et al. |
| 2017/0334484 A1 * | 11/2017 | Koravadi ............. G01S 15/025 |
| 2018/0330526 A1 * | 11/2018 | Corcoran .............. G06T 11/60 |

\* cited by examiner

FIG. 6

VEHICLE COLLISION WARNING SYSTEM AND METHOD

BACKGROUND

In an effort to improve safety, many vehicles are now equipped with systems that detect impending collisions and provide a vehicle operator with an alert that an impending collision has been detected, for example, while the operator is parking the vehicle. However, these systems are susceptible to giving false alerts under certain driving conditions. For example, when a vehicle is operated in a towing mode, in which a trailer is being towed behind the vehicle, the vehicle system may falsely detect an impending collision due to detection of the trailer in close proximity to a rear end of the vehicle, and consequently provide the drier with a false alert.

BRIEF DESCRIPTION

According to one aspect, a vehicle collision warning system provided in a vehicle includes a first sensor, a second sensor, an operator alarm, and a collision warning electronic control unit. The first sensor monitors a rear-center area of the vehicle. The second sensor monitors rear-lateral-corner areas of the vehicle. The operator alarm is configured to selectively provide an alert to an operator of the vehicle. The collision warning electronic control unit includes a rear-center area impending collision detection module, a rear-lateral-corner area impending collision detection module, and an alarm control module. The rear-center area impending collision detection module is configured to detect a rear-center area impending collision based on an input from the first sensor. The rear-lateral-corner area impending collision detection module is configured to detect a rear-lateral-corner area impending collision based on an input from the second sensor. The alarm control module is configured to control the operator alarm in one of a standard mode and a towing mode. In the standard mode, the alarm control module controls the operator alarm to provide the alert to the operator when the rear-center area impending collision is detected by the rear-center area impending collision detection module and/or the rear-lateral-corner area impending collision is detected by the rear-lateral-corner area impending collision detection module. In the towing mode, the alarm control module controls the operator alarm to provide the alert to the operator when the rear-lateral-corner area impending collision is detected by the rear-lateral-corner area impending collision detection module, and to provide no alert to the operator when the rear-center impending collision is detected by the rear-center area impending collision detection module.

According to another aspect, a collision warning electronic control unit includes a rear-center area impending collision detection module, a rear-lateral-corner area impending collision detection module, and an alarm control module. The rear-center area impending collision detection module is configured to detect a rear-center area impending collision. The rear-lateral-corner area impending collision detection module is configured to detect a rear-lateral-corner area impending collision. The alarm control module is configured to control the operator alarm in one of a standard mode and a towing mode. In the standard mode, the alarm control module controls the operator alarm to provide the alert to the operator when the rear-center area impending collision is detected by the rear-center area impending collision detection module and/or the rear-lateral-corner area impending collision is detected by the rear-lateral-corner area impending collision detection module. In the towing mode, the alarm control module controls the operator alarm to provide the alert to the operator when the rear-lateral-corner area impending collision is detected by the rear-lateral-corner area impending collision detection module, and to provide no alert to the operator when the rear-center area impending collision is detected by the rear-center area impending collision detection module.

According to yet another aspect, a method of controlling a vehicle collision warning system includes detecting a rear-center area impending collision and a rear-lateral-corner area impending collision, and determining whether a vehicle is operating in a standard mode or a towing mode. When the vehicle is determined to be operating in the standard mode, an operator alarm is controlled to provide an alert to an operator when the rear-center area impending collision is detected and/or the rear-lateral-corner area impending collision is detected. When the vehicle is determined to be operating in the towing mode, the operator alarm is controlled to provide the alert to the operator when the rear-lateral-corner area impending collision is detected and to provide no alert to the operator when the rear-center area impending collision is detected.

DETAILED DESCRIPTION

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area Network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Computer communication", as used herein, refers to a communication between two or more computing devices (e.g., computer, personal digital assistant, cellular telephone, network device, vehicle, vehicle computing device, infrastructure device, roadside device) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

"Vehicle control system" and/or "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

Figure 1:
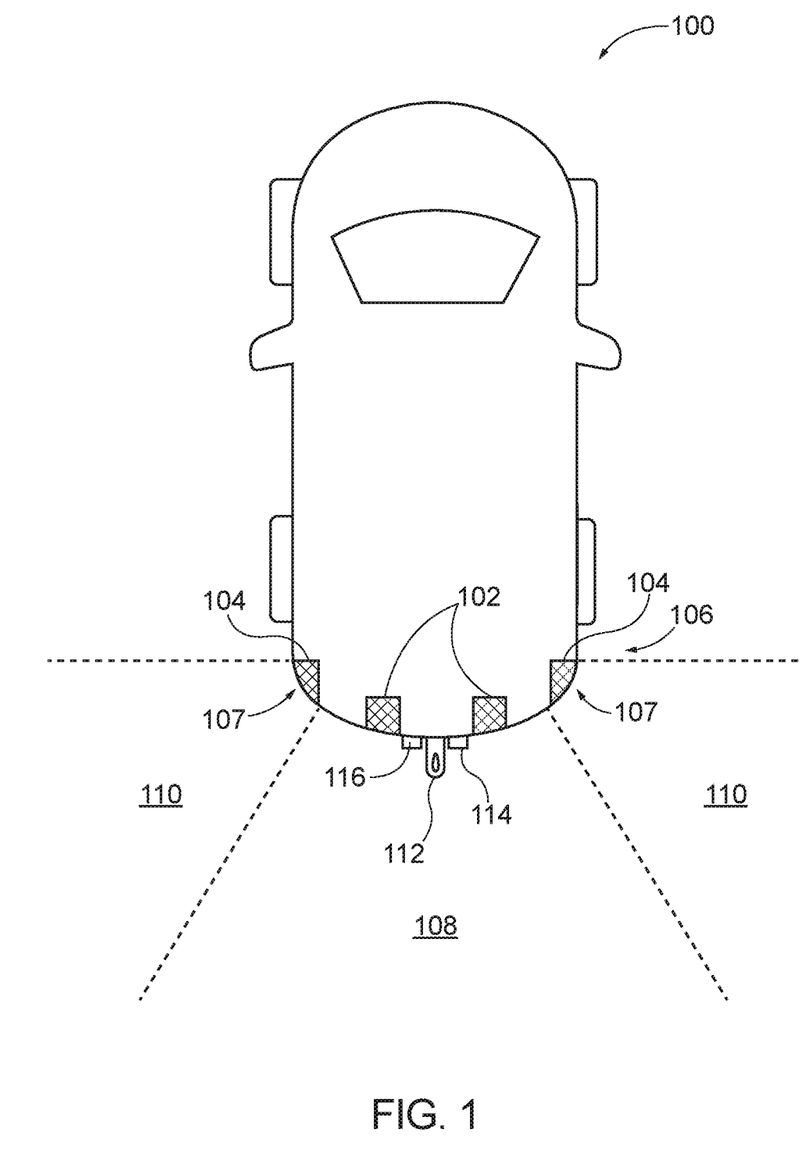
FIG. 1 is a plan schematic view illustrating a vehicle in which the vehicle collision warning system and control method is provided.

Referring to FIG. 1, a vehicle 100 which includes a vehicle collision warning system is schematically shown in isolation, with a first sensor 102 and a second sensor 104 disposed at a rear area 106, which includes rear lateral corners 107, of the vehicle 100. The first sensor 102 can include one or more (e.g., two) sensors configured to monitor a rear-center area 108 of the vehicle 100. The second sensor 104 can include one or more sensors provided at each rear lateral corner 107 of the vehicle 100, with each sensor (or group of sensors) of the second sensor 104 being configured to monitor a respective rear-lateral-corner area (the two rear-lateral-corner areas together constituting and being referred to herein as a singular "rear-lateral-corner area 110").

The vehicle 100 shown in FIG. 1 further includes a mechanism for connection with a trailer 101 (see FIGS. 3A, 4A, and 5A), such as a trailer hitch 112 and a harness receptacle 114. The connection between the vehicle 100 and the trailer 101 via the trailer hitch 112 allows the trailer 101 relative to the vehicle 100 about the trailer hitch 112. The amount or angle of pivot of the trailer 101 relative to the vehicle 100 is affected by, e.g., a steering angle of the vehicle 100.

The vehicle 100 can also include a camera 116 disposed at the rear area 106 of the vehicle 100 and configured to capture an image including both the rear-center area 108 of the vehicle 100 and the rear-lateral-corner area 110 of the vehicle 100.

As used herein, the rear-center area 108 of the vehicle 100 refers to an area immediately behind the rear area 106 of the vehicle 100, as well as an area that is slightly offset from the area that is immediately behind the rear area 106 of the vehicle 100. The rear-center area 108, as used herein, refers to an angular range behind the vehicle 100 at which, when the vehicle 100 is towing the trailer 101 and the trailer 101 is entirely within the rear-center area 108, as in FIGS. 3A and 4A, the trailer 101 poses no substantial risk of contacting the rear lateral corner 107 of the vehicle 100 disposed at lateral outer ends of the rear area 106 of the vehicle 100 and rear ends of lateral surfaces of the vehicle 100.

As used herein, the rear-lateral-corner area 110 of the vehicle 100 refers to an area immediately laterally offset from the rear-center area 108 and extending outwardly from the rear lateral corner 107 of the vehicle 100. The rear-lateral-corner area 110, as used herein, refers to an angular range laterally offset from the rear-center area 108 at which, when the vehicle 100 is towing the trailer 101 and any portion of the trailer 101 is within the rear-lateral-corner area 110, as in FIG. 5A, the trailer 101 poses a substantial risk of contacting the rear lateral corner 107 of the vehicle 100. The rear-lateral-corner area 110, as used herein, can also refer to the angular range laterally offset from the rear-center area 108 at which, when the vehicle 100 is towing the trailer 101, the rear lateral corner 107 is exposed to contact by a foreign object (i.e., is not blocked from contact with the vehicle 100 by the trailer 101).

As used herein, the substantial risk of contacting any portion of the vehicle 100 (i.e., rear lateral corner 107 of the vehicle 100) refers to the trailer 101, or any other object, being disposed within a predetermined distance of the vehicle 100 (e.g., as detected by the second sensor 104). The predetermined distance can be determined, e.g., as being a distance at which an alert would provide the operator sufficient time to respond, and can be a fixed distance and/or a distance determined based on a vehicle speed. The substantial risk of contact can also be determined in view of the relative speed of the vehicle 100, the trailer 101, and/or any other object.

Figure 2:
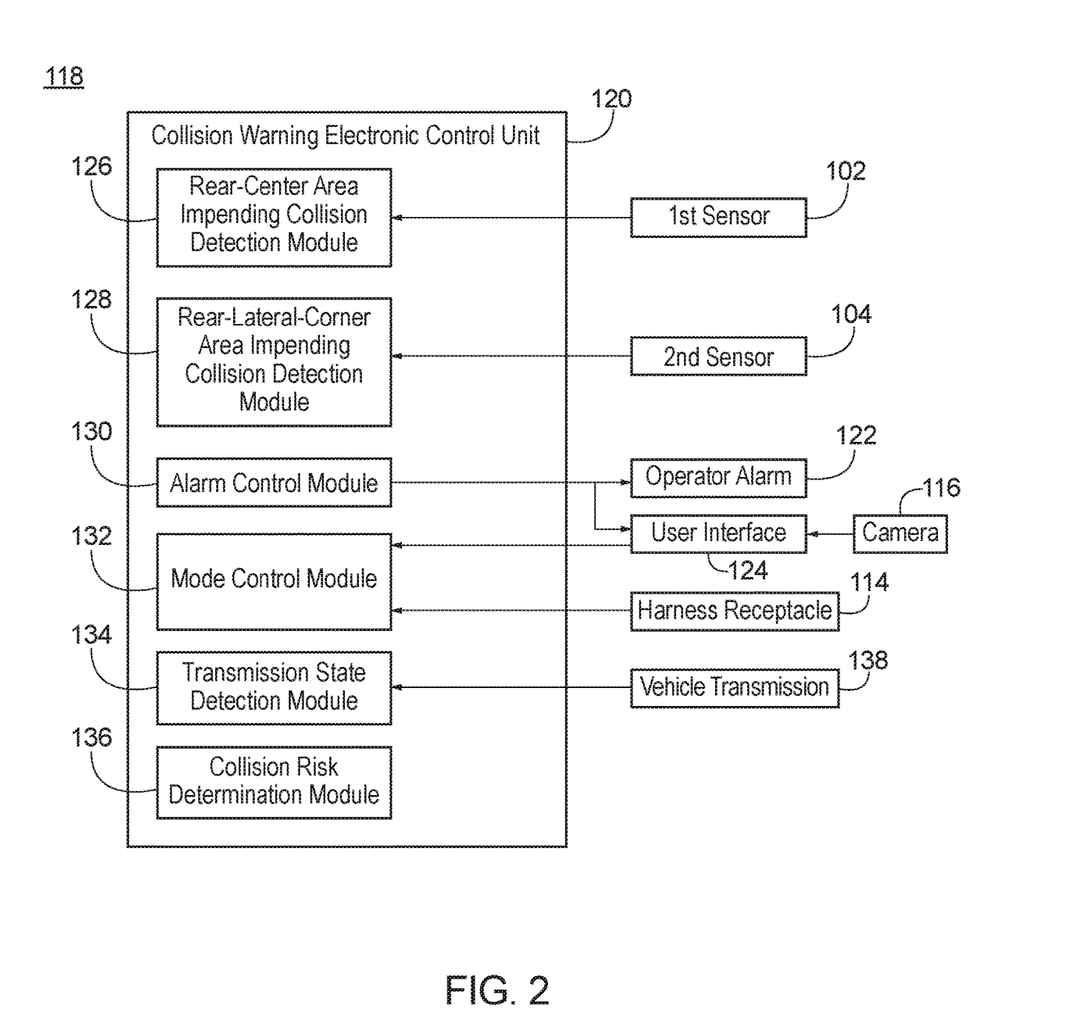
FIG. 2 is a block schematic illustrating a collision warning electronic control unit and the modules thereof.

Referring to FIG. 2, the vehicle 100 employs a vehicle collision warning system 118 that includes, among other features of the vehicle 100 described above, a collision warning electronic control unit (ECU) 120 that is operably connected to other vehicle systems to perform computer communication and processing, described in detail below, to provide the vehicle operator an alert of an impending collision. In connection with this and other features, the vehicle 100 further includes an operator alarm 122 and a user interface 124.

In connection with providing the vehicle operator the alert, the collision warning ECU 120 can be configured by one or more processors, the necessary memory, and a control program stored on the memory which, when executed by the processor, causes the collision warning ECU 120 to perform the herein-described functions. The collision warning ECU 120 can be provided as an independent module or modules, or incorporated in other vehicle systems, such as a central vehicle ECU.

The herein-described functions can be performed by a plurality of modules of the collision warning ECU 120, which can include a rear-center area impending collision detection module 126, a rear-lateral-corner area impending collision detection module 128, an alarm control module 130, a mode control module 132, a transmission state detection module 134, and a collision risk determination module 136. It should be appreciated that the modules described herein refer to functional aspects performed by the collision warning ECU 120, and need not be specifically provided via discrete hardware or software, and can be combined with each other or otherwise separated while remaining within the scope of the instant disclosure.

The rear-center area impending collision detection module 126 is configured to detect a rear-center area impending collision, which is an impending collision with the vehicle 100 from an object within the rear-center area 108, based on an input from the first sensor 102. The rear-lateral-corner area impending collision detection module 128 is configured to detect a rear-lateral-corner area impending collision, which is an impending collision with the vehicle 100 from an object within the rear-later-corner area 110, based on an input from the second sensor 104.

To facilitate in the detection of the rear-center area impending collision and the rear-lateral-corner area impending collision, the first sensor 102 and the second sensor 104 can take the form of any sensors known to perform or facilitate proximity detection with respect to the vehicle 100. For example, the first sensor 102 and the second sensor 104 can be cameras which communicate input signals to a processor, either included in the collision warning ECU 120 or a different vehicle system, that performs object recognition to detect and/or determine a position and movement of an object relative to the vehicle 100, to thereby also determine when a collision of the object with the vehicle is impending. The first sensor 102 and the second sensor 104 can take the form of any other sensor capable of performing the described function, such as optical or sonar sensors, etc.

Accordingly, the rear-center area impending collision detection module 126 and the rear-lateral-corner area impending collision detection module 128 can receive inputs from the respective first sensor 102 and the second sensor 104, or from vehicle systems associated therewith, indicating that the relevant impending collision has been detected. Alternatively, the rear-center area impending collision detection module 126 and the rear-lateral-corner area impending collision detection module 128 can receive the inputs and independently process the inputs, according to known methods and protocols, to detect the respective impending collisions.

For the purpose of this application, the term "impending collision", as used in the context of the rear-center area impending collision and the rear-lateral-corner area impending collision, refers to a state in which, based on inputs from the first sensor 102 and the second sensor 104, a collision is determined as being certain and/or highly likely to occur within a relatively short predetermined time period (i.e., a matter of seconds, e.g., one second, two seconds) if the vehicle 100 and/or an object detected as being involved in the impending collision maintains its/their current movement.

The alarm control module 130 is configured to control the operator alarm 122 in one of a standard mode and a towing mode. In the standard mode, the alarm control module 130 controls the operator alarm 122 to provide the alert to the operator when the rear-center area impending collision is detected by the rear-center area impending collision detection module 126 and/or the rear-lateral-corner area impending collision is detected by the rear-lateral-corner area impending collision detection module 128 (i.e, when either the rear-center area impending collision or the rear-lateral-corner area impending collision is detected, the alarm control module 130 controls the operator alarm 122 to provide the alert to the operator). In the towing mode, the alarm control module 130 controls the operator alarm 122 to provide the alert to the operator when the rear-lateral-corner area impending collision is detected by the rear-lateral-corner area impending collision detection module 128, and to provide no alert to the operator when the rear-center impending collision is detected by the rear-center area impending collision detection module 126.

The operator alarm 122 can take the form of any device that can provide an alert for the operator that, e.g., catches the operator's attention. For example, the vehicle 100 can be equipped with a speaker (not shown) that outputs an audible noise (e.g., a beep). Alternatively (or in addition), the operator alarm 122 can be a device that provides haptic feedback, e.g., by vibrating a steering wheel (not shown) of the vehicle 100, or visual feedback via the user interface 124 or other mechanisms (e.g., flashing lights within the vehicle 100). The operator alarm 122 is controlled by the alarm control module 130 so as to provide the alert, by any configured mechanisms, as discussed above.

The alarm control module 130 determines whether to operate in the standard mode or the towing mode state based on the mode control module 132. In turn, the mode control module 132 toggles between a towing mode ON state and a towing mode OFF state based on a towing mode instruction. When the mode control module is in the towing mode ON state, the alarm control module 130 operates in the towing mode. When the mode control module is in the towing mode OFF state, the alarm control module 130 operates in the standard mode.

The towing mode instruction which directs the toggling of the mode control module 132 between the towing mode ON state and the towing mode OFF state can be provided via operator input and/or automatic detection of the vehicle 100 connecting to the trailer 100.

For example, the user interface 124 can allow for the operator to select a towing mode from among a plurality of driving modes, with the selection thereof (i.e., of either the towing mode or a non-towing mode) serving to transmit the towing mode instruction from the user interface 124 to the mode control module 132.

Alternatively, the collision warning ECU 120 can be configured to automatically detect (or receive a signal when a different vehicle system detects) when the vehicle 100 is towing the trailer 101 and upon such detection have mode control module 132 toggle between the towing mode ON state and the towing mode OFF state and the alarm control module 130 operate in the towing mode or the standard mode, as appropriate. For example, the collision warning ECU 120 can communicate with the harness receptacle 114 so as to receive a signal when the harness receptacle 114 is connected to or disconnected from a trailer harness of the trailer 101. The signal indicating the connected or disconnected state constitutes the towing mode instruction, based on which the mode control module 132 toggles between the towing mode ON state (when the harness receptacle 114 communicates a signal indicating that the trailer harness of the trailer 101 is connected to the harness receptacle 114) and the towing mode OFF state (when the harness receptacle 114 communicates a signal indicating that the trailer harness of the trailer 101 is disconnected from the harness receptacle 114).

Other mechanisms for the automatic detection of the towing mode can be employed. For example, a weight sensor or other sensor can be applied to the trailer hitch 112 to detect engagement with the trailer 101, or processing can be provided to detect the trailer 101 using the first sensor 102 and the second sensor 104 (i.e., to distinguish the trailer 101 from other objects surrounding the vehicle 100).

The vehicle collision warning system 118, by virtue of considering the presence or absence of the trailer 101 behind the vehicle 100, may be limited to operation only when a transmission state of a vehicle transmission 138 of the vehicle 100 is reverse. In this regard, the risk of collision between the vehicle 100 and the trailer 101 may be maximized while the vehicle 100 is parking with the transmission state of the vehicle transmission 138 in reverse. Accordingly, rather than having the alarm control module 130 operate in the standard mode and/or the towing mode at all times, the alarm control module 130 may only operate in one of these modes when the transmission state detection module 134 detects the transmission state of the vehicle transmission 138 as being reverse. This detection can be made based on a signal input to the collision warning ECU 120 from the vehicle transmission 138, e.g., through the vehicle ECU or other vehicle systems.

When the operation of the alarm control module 130 in the standard and towing modes is limited to times when the transmission state of the vehicle transmission 138 is in reverse, the alarm control module 130 operates in the standard mode in the towing mode OFF state when the transmission state detection module 134 detects the vehicle transmission state of the vehicle transmission 138 to be reverse, and operates in the towing mode in the towing mode ON state when the transmission state detection module 134 detects the vehicle transmission state of the vehicle transmission 138 to be reverse. According to this operation, the standard mode and the towing mode referenced herein may properly be referred to as a standard reverse parking mode and a standard reverse towing mode, to distinguish from any standard and towing mode operations that could be performed by the alarm control module 130 or other vehicle systems while the transmission state of the vehicle transmission 138 is other than reverse. Alternatively, the alarm control module 130 can operate in the standard mode at all times in the towing mode OFF state, and in the towing mode only when the transmission state detection module 134 detects the vehicle transmission state of the vehicle transmission 138 to be reverse.

In addition to providing the operator an alert via the operator alarm 122, the vehicle collision warning system 118 can also notify the operator of a risk of collision and/or the detection of the impending collision. To this end, the user interface 124 can include a vehicle display with a display screen 140 (see FIGS. 3B, 4B, 5B). The display screen 140 can, under certain scenarios, display the image captured by the camera 116. For example, when the alarm control module 130 is operating in the standard mode or the towing mode and/or when the transmission state detection module 134 detects the vehicle transmission state of the vehicle transmission 138 to be reverse, and/or when an impending collision is detected and/or the risk of collision is determined to exceed a predetermined threshold, the display screen 140 can display the image captured by the camera 116.

The camera 116 can take the form of any known camera element that captures an image, such as those commonly used on vehicles. The camera 116 may be provided as a single camera or a plurality of cameras whose inputs are used to form a cohesive image for presentation to an operator. In embodiments in which the first sensor 102 and/or the second sensor 104 are provided by or include cameras, the camera 116 can be incorporated in the first sensor 102 and/or the second sensor 104.

The collision risk determination module 136 of the collision warning ECU 120 is provided to determine the risk of collision; specifically, a risk of a rear-center area collision based on the input from the first sensor 102, and a risk of a rear-lateral-corner area collision based on the input from the second sensor 104. The determination of the risk of either collision can be made according to known protocols and computational techniques, e.g., similar to those used to detect the respective impending collisions. The risk of collision can be determined by detecting an object (e.g., the trailer 101), determining a relative speed, direction, and position of the object relative to the vehicle 100, assessing whether the object is on a path to collide with the vehicle 100, and increasing the probability as the relative speed of the object increases and the distance between the object and the vehicle 100 decreases. In this regard, detection of the impending collision and the determination of the risk of collision can be performed as part of a single process, with the impending collisions being detected when the risk of collision exceeds a predetermined threshold value.

The alarm control module 130 can use the risk of the rear-center area collision and the risk of the rear-lateral-corner area collision determined by the collision risk determination module 136 to control the user interface 124 to display on the display screen 140, with the image captured by the camera 116, rear-center area visual warning elements 142 on the image indicating the risk of the rear-center area collision, and rear-lateral-corner area visual warning elements 144 on the image indicating the risk of the rear-lateral-corner area collision. The rear-center area visual warning elements 142 and the rear-lateral-corner area visual warning elements 144 can be modified to increase in the severity of a provided warning as the risk of collision increases. For example, where the rear-center area visual warning elements 142 and the rear-lateral-corner area visual warning elements 144 are provided as bars, the number, color, or size of the bars can be increased with the increase of the determined risk.

The alarm control module 130 can be configured to control the user interface 124 to display on the display screen 140 the image captured by the camera 116 with the rear-center area visual warning elements 142 and the rear-lateral-corner area visual warning elements 144 in a same manner regardless of whether the alarm control module 130 is operating in the standard mode or the towing mode. Alternatively, the alarm control module 130 can be configured so that: in the standard mode, the alarm control module 130 controls the user interface 124 to display on the display screen 140 the image captured by the camera 116 with the rear-center area visual warning elements 142 and the rear-lateral-corner area visual warning elements 144; and in the towing mode, the alarm control module 130 controls the user interface 124 to display on the display screen 140 the image captured by the camera 116 with, among the rear-center area visual warning elements 142 and the rear-lateral-corner area visual warning elements 144, only the rear-lateral-corner area visual warning elements 144. By only displaying the rear-lateral-corner area visual warning elements 144 while in the towing mode, the display screen 140 is not cluttered with warning elements (i.e., the rear-center area visual warning elements 142) that are not relevant to the operator, such as the rear-center area visual warning elements 142 which would result from detection of the trailer 101.

Figure 3A:
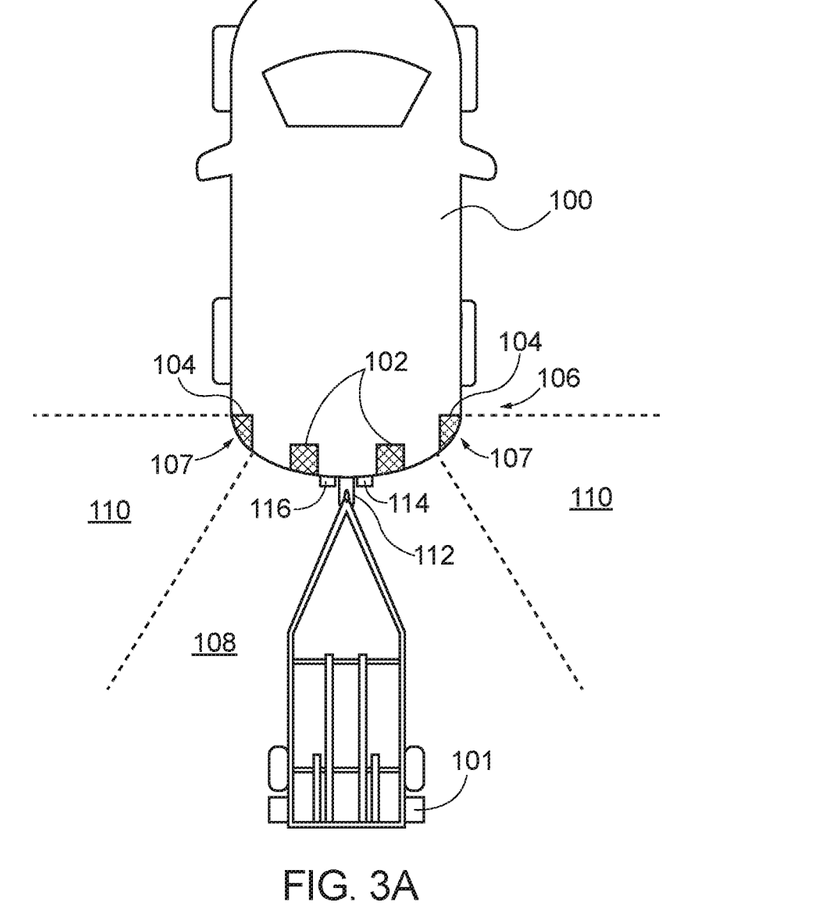
FIG. 3A is a plan schematic view illustrating the vehicle of FIG. 1 in a towing mode with a trailer disposed directly behind the vehicle within a rear-center area of the vehicle.

In view of the above description, operation of the vehicle collision warning system 118 and a method associated therewith will now be made with reference to FIGS. 3A-6. In this regard, FIGS. 3A, 4A, and 5A show the vehicle 100 with the trailer 101 connected thereto via the trailer hitch 112 and the harness receptacle 114. FIGS. 3A and 4A depict the trailer 101 being fully within the rear-center area 108 of the vehicle 100. FIG. 5A depicts the trailer 101 with a portion thereof in the rear-lateral-corner area 110, in which the trailer 101 poses a risk of contact with the vehicle 100.

Figure 3B:
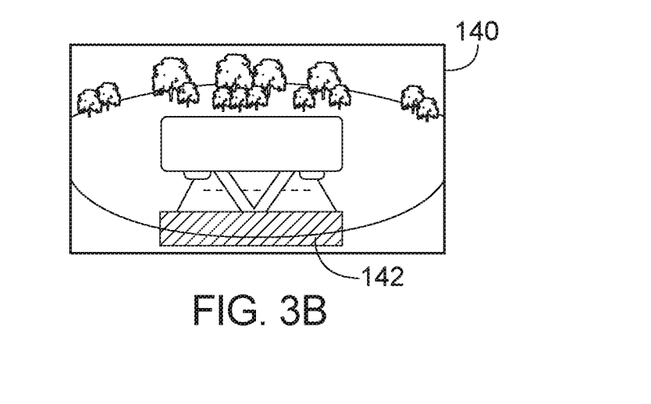
FIG. 3B is a view showing a display of a display screen provided in the vehicle when the vehicle is in the towing mode with the trailer in the position shown in FIG. 3A.
Figure 4A:
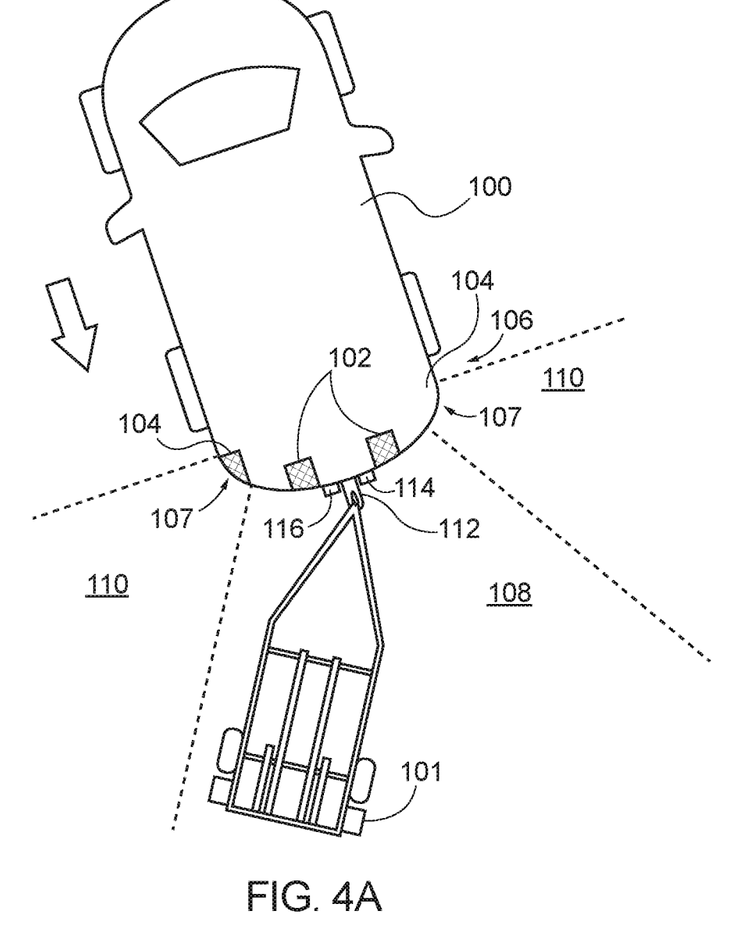
FIG. 4A is a plan schematic view illustrating the vehicle of FIG. 1 in the towing mode with the trailer disposed at a position that is laterally offset from that of FIG. 3A and still within the rear-center area of the vehicle.
Figure 4B:
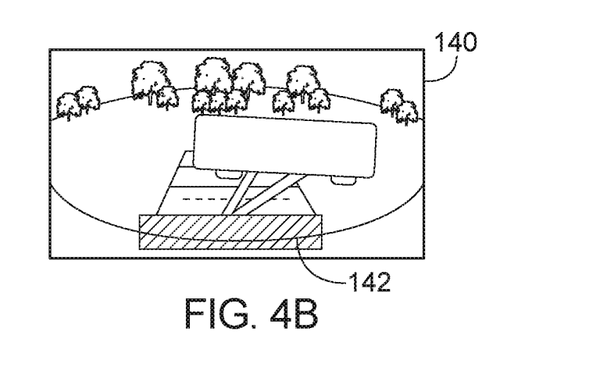
FIG. 4B is a view showing a display of a display screen provided in the vehicle when the vehicle is in the towing mode with the trailer in the position shown in FIG. 4A.
Figure 5A:
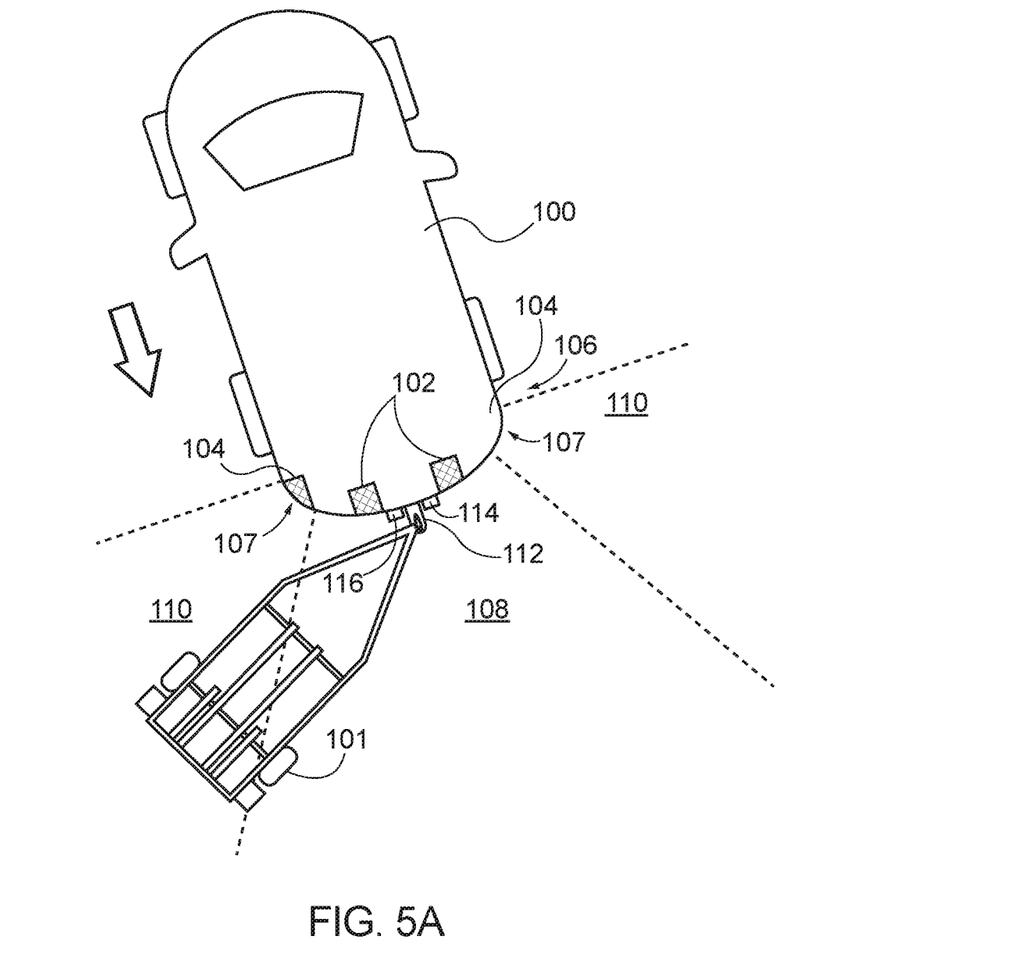
FIG. 5A is a plan schematic view illustrating the vehicle of FIG. 1 in the towing mode with the trailer disposed at a position that is laterally offset from that of FIGS. 3A and 3B, with a portion of the trailer disposed in a rear-lateral corner area of the vehicle.
Figure 5B:
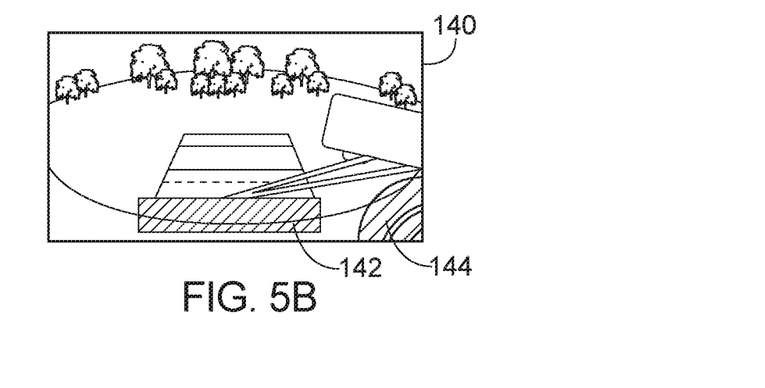
FIG. 5B is a view showing a display of a display screen provided in the vehicle when the vehicle is in the towing mode with the trailer in the position shown in FIG. 5A.

FIGS. 3B, 4B, and 5B show the display of the display screen 140 associated with the respective relative position of the trailer 101 for each of FIGS. 3A, 4A, and 5A.

Due to the proximity of the trailer 101 to the rear area 106 of the vehicle 100, the rear-center area impending collision detection module 126 will, at nearly all times, detect the rear-center area impending collision when the trailer 101 is connected to the vehicle 100. If not accounted for, this could result in the operator alarm 122 being controlled by the alarm control module 130 to constantly provide the alert to the operator when the trailer 101 is connected to the vehicle 100. Naturally, this is undesirable as the trailer 101 connected to the vehicle 100 does not actually pose a risk of rear-center area collision, and the detection of the rear-center area impending collision due to the connected trailer 101 is a false result. The herein-described collision warning ECU 120, within the vehicle collision warning system 118, is configured to disregard the detected rear-center area impending collision when the trailer 101 is connected to the vehicle 100.

Notwithstanding the above, the trailer 101 connected to the vehicle 100 could still pose a risk of rear-lateral-corner area collision. For example, when the trailer 101 is at a severe angle with respect to the vehicle 100, as shown in FIG. 5A, the trailer 101 could collide with the rear lateral corner 107 of the vehicle 100. Additionally, while the connected trailer 101 may substantially shield the vehicle 100 from rear-center area collisions with other objects, the connected trailer 101 does not shield the vehicle 100 from rear-lateral-corner area collisions with objects. Accordingly, even when in the towing mode with the detection of the rear-center area impending collision being disregarded, detections of the rear-lateral-corner area impending collision should still serve to provide the operator the alert from the operator alarm 122.

Figure 6:
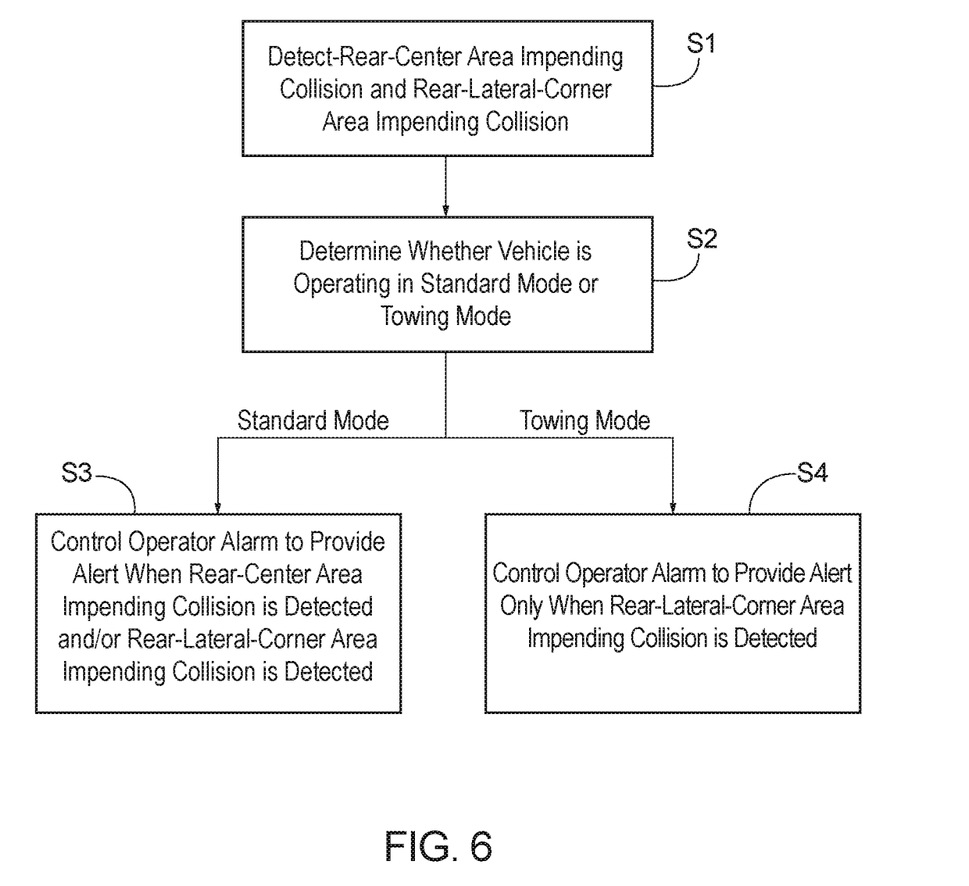
FIG. 6 is a flowchart illustrating a method of controlling the vehicle collision warning system.

Referring to FIG. 6, a method of controlling the above-described vehicle collision warning system includes detecting the rear-center area impending collision (via the rear-center area impending collision detection module 126) and the rear-lateral-corner area impending collision (via the rear-lateral-corner area impending collision detection module 128) (S1) and determining whether the vehicle 100 is operating in the standard mode or the towing mode (using the alarm control module 130, the mode control module 132, and, optionally, the transmission state detection module 134) (S2).

When the vehicle 100 is determined to be operating in the standard mode, the method further includes controlling the operator alarm 122 via the alarm control module 130 to provide the alert to the operator when the rear-center area impending collision is detected by the rear-center area impending collision detection module 126 and/or the rear-lateral-corner area impending collision is detected by the rear-lateral-corner area impending collision detection module 128 (S3). In other words, when either of the rear-center area impending collision or the rear-lateral-corner area impending collision is/are detected, the alarm control module 130 controls the operator alarm 122 to provide the operator the alert.

When the vehicle is determined to be operating in the towing mode, the method further includes controlling the operator alarm 122 via the alarm control module 130 to provide the alert to the operator only when the rear-lateral-corner area impending collision is detected by the rear-lateral-corner area impending collision detection module 128, and to provide no alert to the operator when the rear-center area impending collision is detected by the rear-center area impending collision detection module 126 (S4).

In further connection with the above method, it is to be appreciated that the alarm control module 130 can be further configured to control the display of rear-center area visual warning elements 142 and rear-lateral corner area visual warning elements 144 in connection with the detection of the associated impending collision and/or the determination of a risk of such collision. The alarm control module 130 can control the display of rear-center area visual warning elements 142 and rear-lateral corner area visual warning elements 144 to be the same regardless of whether the vehicle 100 is operating in the standard mode or the towing mode, or the alarm control module 130 can inhibit the display of the rear-center area visual warning elements 142 in the towing mode.

The above description refers to various elements and components as being included as part of the vehicle 100. It is to be appreciated that any of the described components can be considered to be included as part of a vehicle collision warning system provided in the vehicle 100.

It is also to be appreciated that while the above description may focus on an impending rear-lateral-corner area collision between the vehicle 100 and the trailer 101, the rear-lateral-corner area collision can be between the vehicle 100 and objects other than the trailer 101.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle collision warning system provided in a vehicle, comprising:
a first sensor monitoring a rear-center area of the vehicle;
a second sensor monitoring rear-lateral-corner areas of the vehicle;
an operator alarm configured to selectively provide an alert to an operator of the vehicle; and
a collision warning electronic control unit comprising:
a rear-center area impending collision detection module configured to detect a rear-center area impending collision based on an input from the first sensor;
a rear-lateral-corner area impending collision detection module configured to detect a rear-lateral-corner area impending collision based on an input from the second sensor; and
an alarm control module configured to control the operator alarm in one of a standard mode and a towing mode,
wherein
in the standard mode, the alarm control module controls the operator alarm to provide the alert to the operator when the rear-center area impending collision is detected by the rear-center area impending collision detection module and/or the rear-lateral-corner area impending collision is detected by the rear-lateral-corner area impending collision detection module, and
in the towing mode, the alarm control module controls the operator alarm to provide the alert to the operator when the rear-lateral-corner area impending collision is detected by the rear-lateral-corner area impending collision detection module, and to provide no alert to the operator when the rear-center impending collision is detected by the rear-center area impending collision detection module.

2. The vehicle collision warning system according to claim 1, wherein the operator alarm comprises a speaker controlled by the alarm module to selectively provide an audible sound as the alert to the operator.

3. The vehicle collision warning system according to claim 1, further comprising a user interface configured to receive a towing mode instruction from the operator and to transmit the towing mode instruction to the collision warning electronic control unit,
  wherein the collision warning electronic control unit further comprises a mode control module which toggles between a towing mode ON state and a towing mode OFF state based on the towing mode instruction, and the alarm control module is configured to operate in the standard mode in the towing mode OFF state and in the towing mode in the towing mode ON state.

4. The vehicle collision warning system according to claim 3, wherein the collision warning electronic control unit further comprises a transmission state detection module which detects a transmission state of the vehicle, and
  the alarm control module operates in the standard mode in the towing mode OFF state when the transmission state detection module detects the vehicle transmission state to be reverse, and operates in the towing mode in the towing mode ON state when the transmission state detection module detects the vehicle transmission state to be reverse.

5. The vehicle collision warning system according to claim 4, further comprising at least one camera that captures an image including both the rear-center area of the vehicle and the rear-lateral-corner areas of the vehicle,
  wherein the user interface includes a display screen,
  wherein the collision warning electronic control unit further comprises a collision risk determination module configured to determine a risk of a rear-center area collision based on the input from the first sensor, and a risk of a rear-lateral-corner area collision based on the input from the second sensor, and
  wherein the alarm control module, in both the standard mode and the towing mode, is configured to control the user interface to display on the display screen the image captured by the at least one camera, and to display on the display screen rear-center area visual warning elements on the image indicating the risk of the rear-center area collision, and to display on the display screen rear-lateral-corner area visual warning elements on the image indicating the risk of the rear-lateral-corner area collision.

6. The vehicle collision warning system according to claim 4, further comprising at least one camera that captures an image including both the rear-center area of the vehicle and the rear-lateral-corner areas of the vehicle,
  wherein the user interface includes a display screen,
  wherein the collision warning electronic control unit further comprises a collision risk determination module configured to determine a risk of a rear-center area collision based on the input from the first sensor, and a risk of a rear-lateral-corner area collision based on the input from the second sensor, and
  wherein the alarm control module, in the standard mode, is configured to control the user interface to display on the display screen the image captured by the at least one camera, and to display on the display screen rear-center area visual warning elements on the image indicating the risk of the rear-center area collision, and to display on the display screen rear-lateral-corner area visual warning elements on the image indicating the risk of the rear-lateral-corner area collision, and
  wherein the alarm control module, in the towing mode, is configured to control the user interface to display on the display screen the image captured by the at least one camera, and, among the rear-center area visual warning elements and the rear-lateral-corner area visual warning elements, to display on the display screen only the rear-lateral-corner area visual warning elements on the image.

7. The vehicle collision warning system according to claim 3, further comprising at least one camera that captures an image including both the rear-center area of the vehicle and the rear-lateral-corner areas of the vehicle,
  wherein the user interface includes a display screen,
  wherein the collision warning electronic control unit further comprises a collision risk determination module configured to determine a risk of a rear-center area collision based on the input from the first sensor, and a risk of a rear-lateral-corner area collision based on the input from the second sensor, and
  wherein the alarm control module, in both the standard mode and the towing mode, is configured to control the user interface to display on the display screen the image captured by the at least one camera, and to display on the display screen rear-center area visual warning elements on the image indicating the risk of the rear-center area collision, and to display on the display screen rear-lateral-corner area visual warning elements on the image indicating the risk of the rear-lateral-corner area collision.

8. The vehicle collision warning system according to claim 3, further comprising at least one camera that captures an image including both the rear-center area of the vehicle and the rear-lateral-corner areas of the vehicle,
  wherein the user interface includes a display screen,
  wherein the collision warning electronic control unit further comprises a collision risk determination module configured to determine a risk of a rear-center area collision based on the input from the first sensor, and a risk of a rear-lateral-corner area collision based on the input from the second sensor, and
  wherein the alarm control module, in the standard mode, is configured to control the user interface to display on the display screen the image captured by the at least one camera, and to display on the display screen rear-center area visual warning elements on the image indicating the risk of the rear-center area collision, and to display on the display screen rear-lateral-corner area visual warning elements on the image indicating the risk of the rear-lateral-corner area collision, and
  wherein the alarm control module, in the towing mode, is configured to control the user interface to display on the display screen the image captured by the at least one camera, and, among the rear-center area visual warning elements and the rear-lateral-corner area visual warning elements, to display on the display screen only the rear-lateral-corner area visual warning elements on the image.

9. The vehicle collision warning system according to claim 1, further comprising:
  at least one camera that captures an image including both the rear-center area of the vehicle and the rear-lateral-corner areas of the vehicle; and
  a user interface including a display screen, wherein the collision warning electronic control unit further comprises a collision risk determination module configured to determine a risk of a rear-center area collision based on the input from the first sensor, and a risk of a rear-lateral-corner area collision based on the input from the second sensor, and wherein the alarm control module, in both the standard mode and the towing mode, is configured to control the user interface to display on the display screen the image captured by the at least one camera, and to display on the display screen rear-center area visual warning elements on the image indicating the risk of the rear-center area collision, and to display on the display screen rear-lateral-corner area visual warning elements on the image indicating the risk of the rear-lateral-corner area collision.

10. The vehicle collision warning system according to claim 1, further comprising:
at least one camera that captures an image including both the rear-center area of the vehicle and the rear-lateral-corner areas of the vehicle; and
a user interface including a display screen,
wherein the collision warning electronic control unit further comprises a collision risk determination module configured to determine a risk of a rear-center area collision based on the input from the first sensor, and a risk of a rear-lateral-corner area collision based on the input from the second sensor, and
wherein the alarm control module, in the standard mode, is configured to control the user interface to display on the display screen the image captured by the at least one camera, and to display on the display screen rear-center area visual warning elements on the image indicating the risk of the rear-center area collision, and to display on the display screen rear-lateral-corner area visual warning elements on the image indicating the risk of the rear-lateral-corner area collision, and
wherein the alarm control module, in the towing mode, is configured to control the user interface to display on the display screen the image captured by the at least one camera, and, among the rear-center area visual warning elements and the rear-lateral-corner area visual warning elements, to display on the display screen only the rear-lateral-corner area visual warning elements on the image.

11. The vehicle collision warning system according to claim 1, further comprising a harness receptacle configured to connect to a trailer harness and to transmit a towing mode instruction to the collision warning electronic control unit based on a connection state of the trailer harness to the harness receptacle,
wherein the collision warning electronic control unit further comprises a mode control module which toggles between a towing mode ON state and a towing mode OFF state based on the towing mode instruction, and
the alarm control module is configured to operate in the standard mode in the towing mode OFF state and in the towing mode in the towing mode ON state.

12. The vehicle collision warning system according to claim 11, wherein the collision warning electronic control unit further comprises a transmission state detection module which detects a transmission state of the vehicle, and
the alarm control module operates in the standard mode in the towing mode OFF state when the transmission state detection module detects the vehicle transmission state to be reverse, and operates in the towing mode in the towing mode ON state when the transmission state detection module detects the vehicle transmission state to be reverse.

13. The vehicle collision warning system according to claim 12, further comprising:
at least one camera that captures an image including both the rear-center area of the vehicle and the rear-lateral-corner areas of the vehicle; and
a user interface comprising a display screen,
wherein the collision warning electronic control unit further comprises a collision risk determination module configured to determine a risk of a rear-center area collision based on the input from the first sensor, and a risk of a rear-lateral-corner area collision based on the input from the second sensor, and
wherein the alarm control module, in both the standard mode and the towing mode, is configured to control the user interface to display on the display screen the image captured by the at least one camera, and to display on the display screen rear-center area visual warning elements on the image indicating the risk of the rear-center area collision, and to display on the display screen rear-lateral-corner area visual warning elements on the image indicating the risk of the rear-lateral-corner area collision.

14. The vehicle collision warning system according to claim 12, further comprising:
at least one camera that captures an image including both the rear-center area of the vehicle and the rear-lateral-corner areas of the vehicle; and
a user interface comprising a display screen,
wherein the collision warning electronic control unit further comprises a collision risk determination module configured to determine a risk of a rear-center area collision based on the input from the first sensor, and a risk of a rear-lateral-corner area collision based on the input from the second sensor, and
wherein the alarm control module, in the standard mode, is configured to control the user interface to display on the display screen the image captured by the at least one camera, and to display on the display screen rear-center area visual warning elements on the image indicating the risk of the rear-center area collision, and to display on the display screen rear-lateral-corner area visual warning elements on the image indicating the risk of the rear-lateral-corner area collision, and
wherein the alarm control module, in the towing mode, is configured to control the user interface to display on the display screen the image captured by the at least one camera, and, among the rear-center area visual warning elements and the rear-lateral-corner area visual warning elements, to display on the display screen only the rear-lateral-corner area visual warning elements on the image.

15. The vehicle collision warning system according to claim 11, further comprising:
at least one camera provided to capture an image including both the rear-center area of the vehicle and the rear-lateral-corner areas of the vehicle; and
a user interface including a display screen,
wherein the collision warning electronic control unit further comprises a collision risk determination module configured to determine a risk of a rear-center area collision based on the input from the first sensor, and a risk of a rear-lateral-corner area collision based on the input from the second sensor, and wherein the alarm control module, in both the standard mode and the towing mode, is configured to control the user interface to display on the display screen the image captured by the at least one camera, and to display on the display screen rear-center area visual warning elements on the image indicating the risk of the rear-center area collision, and to display on the display screen rear-lateral-corner area visual warning elements on the image indicating the risk of the rear-lateral-corner area collision.

16. The vehicle collision warning system according to claim 11, further comprising:
at least one camera that captures an image including both the rear-center area of the vehicle and the rear-lateral-corner areas of the vehicle; and
a user interface including a display screen,
wherein the collision warning electronic control unit further comprises a collision risk determination module configured to determine a risk of a rear-center area collision based on the input from the first sensor, and a risk of a rear-lateral-corner area collision based on the input from the second sensor, and
wherein the alarm control module, in the standard mode, is configured to control the user interface to display on the display screen the image captured by the at least one camera, and to display on the display screen rear-center area visual warning elements on the image indicating the risk of the rear-center area collision, and to display on the display screen rear-lateral-corner area visual warning elements on the image indicating the risk of the rear-lateral-corner area collision, and
wherein the collision warning electronic control unit, in the towing mode, is configured to control the user interface to display on the display screen the image captured by the at least one camera, and, among the rear-center area visual warning elements and the rear-lateral-corner area visual warning elements, to display on the display screen only the rear-lateral-corner area visual warning elements on the image.

17. A collision warning electronic control unit configured to be provided in a vehicle and to control an operator alarm to provide an alert to an operator,
the collision warning electronic control unit comprising:
a rear-center area impending collision detection module configured to detect a rear-center area impending collision;
a rear-lateral-corner area impending collision detection module configured to detect a rear-lateral-corner area impending collision; and
an alarm control module configured to control the operator alarm in one of a standard mode and a towing mode,
wherein
in the standard mode, the alarm control module controls the operator alarm to provide the alert to the operator when the rear-center area impending collision is detected by the rear-center area impending collision detection module and/or the rear-lateral-corner area impending collision is detected by the rear-lateral-corner area impending collision detection module, and
in the towing mode, the alarm control module controls the operator alarm to provide the alert to the operator when the rear-lateral-corner area impending collision is detected by the rear-lateral-corner area impending collision detection module, and to provide no alert to the operator when the rear-center impending collision is detected by the rear-center area impending collision detection module.

18. The collision warning electronic control unit according to claim 17, wherein the collision warning electronic control unit receives inputs from at least one sensor monitoring a rear-center area of the vehicle and a rear-lateral-corner area of the vehicle, and the rear-center area impending collision detection module detects the rear-center area impending collision based on the inputs and the rear-lateral-corner area impending collision detection module detects the rear-lateral-corner area impending collision based on the inputs.

19. The collision warning electronic control unit according to claim 18, wherein the collision warning electronic control unit further comprises a mode control module which toggles between a towing mode ON state and a towing mode OFF state based on a towing mode instruction, and the alarm control module is configured to operate in the standard mode in the towing mode OFF state and in the towing mode in the towing mode ON state.

20. A method of controlling a vehicle collision warning system, comprising:
detecting a rear-center area impending collision and a rear-lateral-corner area impending collision;
determining whether a vehicle is operating in a standard mode or a towing mode;
when the vehicle is determined to be operating in the standard mode, controlling an operator alarm to provide an alert to an operator when the rear-center area impending collision is detected and/or the rear-lateral-corner area impending collision is detected, and
when the vehicle is determined to be operating in the towing mode, controlling the operator alarm to provide the alert to the operator when the rear-lateral-corner area impending collision is detected and to provide no alert to the operator when the rear-center area impending collision is detected.

* * * * *